US011151426B2

(12) United States Patent
Dutta et al.

(10) Patent No.: US 11,151,426 B2
(45) Date of Patent: Oct. 19, 2021

(54) SYSTEM AND METHOD FOR CLUSTERING PRODUCTS BY COMBINING ATTRIBUTE DATA WITH IMAGE RECOGNITION (71) Applicant: Walmart Apollo, LLC, Bentonville, AR (US)

(72) Inventors: Tulika Dutta, Bangalore (IN); Mohit Batham, Bangalore (IN); Amlan J. Das, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 71 days.

(21) Appl. No.: 16/521,750

(22) Filed: Jul. 25, 2019

(65) Prior Publication Data

US 2020/0034668 A1 Jan. 30, 2020

Related U.S. Application Data (60) Provisional application No. 62/781,366, filed on Dec. 18, 2018.

(51) Int. Cl.
*G06K 9/00* (2006.01)
*G06K 9/62* (2006.01)
*G06N 20/20* (2019.01)
*G06N 3/04* (2006.01)
*G06N 7/00* (2006.01)

(52) U.S. Cl.
CPC ......... *G06K 9/6278* (2013.01); *G06K 9/6262* (2013.01); *G06N 3/0472* (2013.01); *G06N 7/005* (2013.01); *G06N 20/20* (2019.01)

(58) Field of Classification Search
CPC ............... G06K 9/6278; G06K 9/6262; G06K 9/00718; G06K 9/00797; G06N 20/20; G06N 3/0472; G06N 7/005; H04N 1/40062; G06F 17/30257; G06F 17/3024
See application file for complete search history.

(56) References Cited

U.S. PATENT DOCUMENTS

| 6,246,998 | B1 | 6/2001 | Matsumori |
| 6,434,257 | B1 | 8/2002 | Mohan et al. |
| 7,246,110 | B1* | 7/2007 | Musgrove ............ G06Q 10/087 |
| 7,660,468 | B2 | 2/2010 | Gokturk et al. |
| 7,729,977 | B2 | 6/2010 | Xiao et al. |

(Continued)

OTHER PUBLICATIONS

Kausar et al., "A novel framework for classification of cardiovascular disease using local linear embedding as feature selection method". (Sep. 2020), pp. 1-31.*

*Primary Examiner* — Amir Alavi
(74) *Attorney, Agent, or Firm* — Duane Morris LLP; Manita Rawat (57) ABSTRACT

Systems, methods, and computer-readable storage media for categorizing items based on attributes of the item and a shape of the item, where the shape of the item is determined from an image of the item. An exemplary system configured as disclosed herein can receive a request to categorize an item, the item having a plurality of attributes, and receive an image of the item. The system can identify, via a processor configured to perform image processing, a shape of the item based on the image, and transform the plurality of attributes and the shape of the item, into a plurality of quantifiable values. The system can then categorize the item based on the quantifiable values.

20 Claims, 7 Drawing Sheets (56) References Cited

U.S. PATENT DOCUMENTS

| | | | | |
|---|---|---|---|---|
| 7,831,586 B2* | 11/2010 | Reitter | ................... | G06Q 30/00 |
| | | | | 707/709 |
| 8,019,656 B2* | 9/2011 | Baran | ................ | G06Q 30/0641 |
| | | | | 705/26.7 |
| 8,306,872 B2* | 11/2012 | Inoue | ................... | G06F 16/583 |
| | | | | 705/26.7 |
| 8,526,329 B2 | 9/2013 | Mahany et al. | | |
| 8,781,916 B1* | 7/2014 | Buryak | ............. | G06Q 30/0631 |
| | | | | 705/26.7 |
| 8,787,707 B1* | 7/2014 | Steves | ................ | G06Q 30/0254 |
| | | | | 382/321 |
| 9,230,313 B2* | 1/2016 | Yamazaki | ................ | G06K 9/62 |
| 10,032,184 B2* | 7/2018 | Steves | ................ | G06Q 30/0201 |
| 10,621,240 B2* | 4/2020 | Reitter | ................ | G06F 16/951 |
| 10,678,769 B2* | 6/2020 | Karmakar | ............... | G06N 5/025 |
| 10,832,305 B1* | 11/2020 | Woodbeck | .......... | G06F 16/5866 |
| 2011/0286628 A1 | 11/2011 | Goncalves et al. | | |
| 2012/0095819 A1 | 4/2012 | Li | | |
| 2012/0284105 A1 | 11/2012 | Li | | |
| 2020/0034668 A1* | 1/2020 | Dutta | ................... | G06N 3/0427 |

\* cited by examiner

SYSTEM AND METHOD FOR CLUSTERING PRODUCTS BY COMBINING ATTRIBUTE DATA WITH IMAGE RECOGNITION

PRIORITY

The present disclosure claims priority to Indian Provisional Application 201811028181, filed Jul. 26, 2018, and U.S. Provisional Application 62/781,366, filed Dec. 18, 2018, the contents of which are incorporated herein in their entirety.

BACKGROUND

1. Technical Field

The present disclosure relates to clustering items, and more specifically to identifying where products should be clustered based on a combination of distinct classification models.

2. Introduction

Electronic image data and electronic text based data cannot be easily merge red together. These two types of data are stored in different types of database records, and must be processed using different computer systems. That data may represent the same or similar items. But due to the different types of data, the data regarding the items cannot be associated with each other or otherwise linked.

Technical Problem

How to program a computer system to combine different types of electronic data, such as image data and text based data, and combine distinct classification models when a linear combination of the models is not effective for the entire data set.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method performed according to this disclosure can include: receiving a request to categorize an item, the item having a plurality of attributes; executing, via a processor, a first random forest classifier on the plurality of attributes, resulting in a first random forest model; executing, via the processor, a second random forest classifier on an image of the item, resulting in a second random forest model; combining the executed random forest model and the second random forest model into a Bayesian Model Combination (BMC); executing, via the processor, the BMC, to yield BMC results; and classifying, via the processor, the item as belonging to a classification based on the BMC results.

An exemplary system configured according to this disclosure can include: a camera; a processor configured to perform image processing; and a computer-readable storage medium having instructions stored which, when executed by the processor, cause the processor to perform operations including: receiving a request to categorize an item, the item having a plurality of attributes; executing a first random forest classifier on the plurality of attributes, resulting in a first random forest model; executing a second random forest classifier on an image of the item, resulting in a second random forest model; combining the executed random forest model and the second random forest model into a Bayesian Model Combination (BMC); executing the BMC, to yield BMC results; and classifying the item as belonging to a classification based on the BMC results.

An exemplary non-transitory computer-readable storage medium configured according to this disclosure can have instructions stored which, when executed by a computing device, cause the computing device to perform operations which can include: receiving a request to categorize an item, the item having a plurality of attributes; executing a first random forest classifier on the plurality of attributes, resulting in a first random forest model; executing a second random forest classifier on an image of the item, resulting in a second random forest model; combining the executed random forest model and the second random forest model into a Bayesian Model Combination (BMC); executing the BMC, to yield BMC results; and classifying the item as belonging to a classification based on the BMC results.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

Assignment of products to clusters, "lines," or other groups can be based on item attributes. The item attributes can be stored in an electronic database table, then those attributes, or selected attributes, can be extracted to allow for product classification. In addition to attributes, items which have already been assigned to groups in each category can be used for machine learning training.

Consider an example where items in a retail store are assigned to categories or groups. These items can, for example, have been assigned to a group using categories such as:

brand name
size description
vendor unit cost
location within an item hierarchy

Along with the text attribute database records, images data regarding an item may be stored in another data base record. The images can be extracted from an image service API (Application Programming Interface) containing images of items. For example, for some items, a picture of the item can be contained in the data/attributes associated with the item. In other instances, when a new items is delivered, the system takes an image of the item, then stores that image in a database record for the item. In yet other cases there may be no image available for a given items.

Preferably, data which can be used to perform the methods and enable the systems disclosed herein can include (1) attribute data of the items, and (2) images of the items.

In theory, items in same groups are supposed to have similar brand name, sizes, vendor unit cost, and shapes, etc. As disclosed herein, text attributes and images, along with additional data (such as group assignments of similar items) can be used to train algorithms and classify items to appropriate groups. The classification system disclosed herein uses an ensemble of individual classification systems. Specifically, the following classification systems are implemented to improve item classification:

Multiclass Classification using Random Forest Classifier

Multiclass Classification using Convolutional Neural Network based on available images of all items present in a category Ensemble of above models to produce the final predicted class of all items.

Each of these disclosed methods are described in further detail below. The solutions provided can be used automatically process group assignments, such that whenever new items enters the eco-system they can be assigned to a group based on the process output. In an example, text attributes for an item may be extracted from a database, image attributes for the item may be extracted from a database. The extracted data may be merged and normalized, creating a new type of data association.

Multiclass Classification Using Random Forest Classifier

This approach classifies a new item based on its text attributes alone. The data used contains attributes for items, and during modelling the attributes are divided into two parts: categorical (brand name, brand owner name, hierarchy number, size description, etc.) and numerical (vendor unit cost, retail cost, etc.). The system uses these attributes to look for a match (or a similarity score above a threshold value) from a trained dataset, such as a dataset generated based on past iterations, and the system can identify the most likely category/classification based on the similarity score. Separate models can exist for each category.

For example, suppose that for "HAIR APPLIANCES", three different items have the following attribute descriptions:

TABLE 1

| Item | Brand name | Vendor unit cost | Size description | Hierarchy number |
|---|---|---|---|---|
| Item 1 | REMINGTON | 10.01 | 1.0PC | 4509 |
| Item 2 | CONAIR | 15.07 | 1.0EA | 4510 |
| Item 3 | REMINGTON | 12.03 | 1.0EA | 4509 |

The attribute matrix for these 3 items looks like

TABLE 2

| Item | Brand name1 | Brand name 2 | Vendor unit cost | Size description1 | Size description2 | Hierarchy number1 | Hierarchy number2 |
|---|---|---|---|---|---|---|---|
| Item 1 | 1 | 0 | 10.01 | 1 | 0 | 1 | 0 |
| Item 2 | 0 | 1 | 15.07 | 0 | 1 | 0 | 1 |
| Item 3 | 1 | 0 | 12.03 | 0 | 1 | 1 | 0 |

Instead of having only 4 variables (brand name, vendor unit cost, size description, hierarchy description), there are 7 variables—brand name 1, brand name 2, vendor unit size, size, description 1, size description 2, hierarchy number 1, and hierarchy number 2, as categorical variables. That is, each of the attributes is converted to a quantifiable format (such as a binary number, 1 or 0).

Model Training: For training and testing the models, the existing group data can be split. For example, the groups can be split into a 70-30 split on the basis of the item create date, i.e. the oldest 70% data for training purpose and latest 30% data to test the accuracy of the model. Once the model is trained, 100% of the data can be used to categorize items. Likewise, a designated percentage or portion of the data can be used to continuously test the accuracy of the model, particularly as the model goes through revisions/iterations over time. For example, as additional items (and the data associated with those items) are received and categorized, the model is improved. The model revisions/improvements can occur each time a new product is received and entered into the system, once a threshold number of new items are received (e.g., every five new items, update the system), or on a periodic schedule (e.g., every day, week, month, or year). As the model is updated, it will result in a more efficient and/or accurate classification of the items. While the amount of data being stored to form the model may increase, the actual classification itself becomes more accurate over time.

Random Forest Classifier

Random forest is an ensemble learning method for classification, regression, clustering, etc., which operates using many decision trees when trained, then outputting a classification that is the mode (most common) of the classes for classification, and a mean (average) prediction for regression. In effect, it is similar to a bootstrapping algorithm with a decision tree (such as the Classification and Regression Tree (CART) model).

For example, given a thousand observations in a complete population with ten variables, the random forest algorithm can attempt to build multiple CART models with different sample and different initial variables. For instance, the random forest algorithm can take a random sample of one hundred observations and five randomly chosen initial variables to build a CART model. It can then repeat the process, for example, ten times, then make a final prediction on each observation. The final prediction is a function of each prediction. This final prediction can simply be the mean of each prediction.

Random Forest Structure Simplified

Using a random forest model, each ungrouped item can be classified into different existing line price groups (say size N), and for each ungrouped item a probability vector of size N will be produced, where the first value in the vector will indicate the probability of the item to fall in $1^{st}$ class and so on. Hence, if the highest probability value corresponds to the fifth class, then the ungrouped item will be classified to fifth group.

Multiclass Classification using Convolutional Neural Network (CNN)

A customized algorithm was developed to predict the groups to which a new item should most likely be linked based on images available for a category.

Motivation: There are features which can be captured from images which are not available from simple attribute data. These additional features help classify the item fast and more efficiently. For example: The shape of an item can be captured by a camera, which sends the image to a processor for an image analysis. The processor can determine the overall shape of the item, which is not present in the list of item attributes. The processor understands an image as set of pixels with numeric values showing the intensity of the color in consideration. To properly understand an image, the processor must understand how the pixels are arranged.

A convolutional neural network (CNN) can do just that. For a computer/processor, different characteristics within the image become boundaries or curvatures. Through groups of convolutional layers within the CNN, the computer recognizes and constructs more abstract concepts. In more detail: the image is passed through a series of convolutional, nonlinear, pooling layers and fully connected layers, and then generates the output. The convolutional layer occurs first, and is used to determine the overall shape of any object in the image. The image (a matrix of pixel values) is entered into the convolutional layer of the CNN, which processes the image to identify the boundaries/curvatures. For example, imagine that the reading of the input matrix begins at the top left of image. Next the software selects a smaller matrix there, which is called a filter (or neuron, or core).

Then the filter produces convolution, i.e. moves along the input image. The filter's task is to multiply its values by the original pixel values. All these multiplications are summed up. One number is obtained in the end. Since the filter has read the image only in the upper left corner, it moves further and further right by 1 unit performing a similar operation. After passing the filter across all positions, a matrix is obtained, but smaller than an input matrix. This operation, from a human perspective, is analogous to identifying boundaries and simple colors on the image. But in order to recognize the properties of a higher level (such as the trunk or large ears in an image of an elephant) the whole network is needed. The network will consist of several convolutional networks mixed with nonlinear and pooling layers. When the image passes through one convolution layer, the output of the first layer becomes the input for the second layer. This happens with every further convolutional layer.

Model Training:

As with attribute data, the dataset here can be divided according to a 70-30 ratio on the basis of the item creation date. That is, the images of the older 70% items will be used for training purpose and the newer 30% items will be used for testing. As discussed above, this ratio can change as the model becomes trained and begins processing new items. In some cases, not all items present in a category may have images. In other cases, images may be available for the items based on their corresponding UPC (Universal Product Code) numbers. For example, ten items may have same UPC number, and in that case those ten may have only one associated image.

Classification Using Both Images and Attributes

In machine learning, a convolutional neural network (CNN) is a class of deep, feed-forward artificial neural networks, most commonly applied to analyzing visual imagery. In this case, a CNN receives a normal color image as a rectangular box, whose width and height are measured by the number of pixels along those dimensions, and whose depth is three layers deep, one for each letter in RGB. Those depth layers are referred to as channels, such that in every color image there are three channels (red, green and blue). The CNN can be executed as follows:

An image is input to the first convolutional layer. The convoluted output is obtained as an activation map. The filters applied in the convolution layer extract relevant features from the input image to pass further.

Each filter shall give a different feature to aid the correct class prediction. If the size of the image needs to be retained, the same padding (zero padding) can be used, otherwise, valid padding is used because it helps to reduce the number of features. Pooling layers are then added to further reduce the number of parameters.

Several convolution and pooling layers are added before the prediction is made. Convolutional layer help in extracting features. The deeper in the network, the more specific features which are extracted as compared to a shallow network where the features extracted are more generic.

The output layer in a CNN, as mentioned previously, is a fully connected layer, where the input from the other layers is flattened and sent, such that the output transforms into the number of classes as desired by the network. The output is then generated through the output layer and is compared to the output layer for error generation. A loss function can be defined in the fully connected output layer to compute the mean square loss. The gradient of error can also be then calculated. This error can then be back propagated to update the filter (weights) and bias values of the CNN and the model. One training cycle is completed in a single forward and backward pass.

In some cases, the images can be pre-processed. For example, the pixel values can be divided by 255 so that every pixel value lies between 0 and 1. These pixel values can then be moved through a CNN.

The system can use the CNN as an initial baseline. Given that the initial baseline may have only a few examples, overfitting can be a concern. Overfitting can occur when a model exposed to too few examples learns patterns that do not generalize to new data, i.e. when the model starts using irrelevant features for making predictions. The main way to fight overfitting is to choose the number of parameters in the model, i.e. the number of layers, and the size of each layer. To avoid overfitting, the system should have at least 9-10 different item images per group.

Data augmentation is one way to fight overfitting, but it isn't enough because the augmented samples are still highly correlated. To fight overfitting, the model is allowed a higher-than standard entropic capacity, that is, how much information the model is allowed to store. A model that can store a lot of information has the potential to be more accurate by leveraging more features, but it is also more at risk to start storing irrelevant features. Meanwhile, a model that can only store a few features will have to focus on the most significant features found in the data, and these are more likely to be truly relevant and to generalize better.

There are different ways to modulate entropic capacity. The main one is the choice of the number of parameters in your model, i.e. the number of layers and the size of each layer. In this case, a very small CNN with few layers and few filters per layer, alongside data augmentation and dropout can be used. Dropout also helps reduce overfitting, by preventing a layer from seeing twice the exact same pattern, thus acting in a way analogous to data augmentation. To create the small CNN, the CNN should have only three to four convolution and pooling layers.

A more refined approach for this overfitting problem would be to leverage a network pre-trained on a large dataset. Such a network can have already learned features which are useful for computer vision problems, and leveraging such features can provide better accuracy than other methods relying only on the available data. For the test results included herein, a VGG16 architecture is used, the VGG16 architecture being pre-trained on an ImageNet dataset that has been trained with 1.2 million images for ImageNet Large Scale Recognition Challenge into 1000 classes. Other, alternative data architectures can include VGG19, Inception V3, and ResNet50.

The strategy is as follows: instantiate the convolutional part of the model, everything up to the fully-connected layers. That is, the input is not fully connected through the CNN (only the convolution layers). This model is then run on the training and validation data once, recording the output (the "bottleneck features" from the VGG16 model) in two arrays, and then the output is merged with the text attributes available for each item.

A random forest model is then trained on top of the stored features, and each ungrouped item is classified into different existing line price groups (i.e., size $N_1$). For each ungrouped item a probability vector of size $N_1$ is obtained.

Because, in some cases, not all items present in a category have images, it may not be possible to classify every item using this algorithm into existing groups. For example, if for a category there are a hundred existing groups, for each ungrouped item a probability vector is created of size "100" using the first algorithm. However, if within that category only eighty existing groups have at least one item with images, the second algorithm can be trained to only classify within these eighty groups.

For each ungrouped item, from a random forest model using only the ungrouped item's attributes, a probability vector of size N is generated. Using images of the ungrouped item, along with attributes of the ungrouped item, a probability vector of size $N_1$ can be generated. Due to unavailability of data, it may be impossible to classify any item to remaining $(N-N_1)$ groups, and therefore the system imputes a probability score of zero on those remaining $(N-N_1)$ groups to the probability vector coming from the second algorithm.

Ensemble Approach

In some cases, the classification of an item can become a multiclass classification problem. To solve such problems, the system can utilize two random forest models: one with only images and another model using both attributes and images. Learner error can often be reduced by combining information from a set of models. This poses the challenge of finding effective ways to create combinations of learners to produce a final prediction for each ungrouped item present in a category.

In some individual cases, it may happen that one of the two models is more appropriate or capable to predict one or more classes. However, a linear combination of these two models provides a more accurate solution to the overall classification process.

One solution to solving this problem is the use of a Bayesian model combination (BMC) approach to combine the two above algorithms. The most simplistic of Bayesian model combination strategies outperform the traditional ad hoc techniques of bagging and boosting over a wide variety of cases.

Alternatives to a BMC usually choose one of these two models, or a particular linear combination, to produce final prediction. However, there may be cases where one particular linear combination is not effective for the whole data set. For example, there may be a linear combination which provides correct output for 40% cases, and another linear combination provides correct output for 50%. Combining both linear combinations will result in a correct prediction for more than 50% cases. However, combining the linear combinations must be done in a particular way to be effective. A BMC solves this problem by creating all possible linear combinations, then weighting them using their accuracy in a train model, thereby creating the final model that has been used for prediction purpose.

BMC with a Linear Combinations of Models

For a first set of Bayesian model combinations, ensembles can be created using linear combinations of outputs from the base classifiers.

Algorithm:

Using Bayesian model combination strategy the class value assigned to a given item by the overall model is determined by taking the probability of each class value as predicted by a single model, multiplying by the probability that the model is the Data Generating Model (DGM) given a sample of data, and summing these values for all models in the hypothesis space. Let n be the size of a data set D.

Each individual example $d_i$ is comprised of a vector of attribute values $x_i$ and an associated class value $y_i$. The model space is approximated by a finite set of learners, H, with h being an individual hypothesis in that space. Equation 1 illustrates how the probability of a class value is determined for a given example. The class value assigned to the instance will be the one with the maximum probability.

$$p(y_i|x_i,D,H,E) = \Sigma_{e \in E} P(y_i|x_i,H,e) * p(e|D) \qquad \text{Equation (1):}$$

where e is an element in the space E of possible model combinations.

By Bayes' Theorem, the posterior probability of e given D (the posterior probability that e is the Data Generating Model) can be calculated as shown in Equation 1. Here, (e) represents the prior probability of h and the product of the $(e_i|h)$ determines the likelihood.

$$p(e_i|D) = \frac{p(e)}{p(D)} \Pi_{i=1}^n p(e_i|h) \qquad \text{Equation (2)}$$

This approach commonly assumes a uniform class noise model when determining likelihood. With this model, the class of each example is assumed to be corrupted with probability E. This means that $(e_i|h)$ is $1-\varepsilon$ if h correctly predicts class $y_i$ for example $x_i$ and $\varepsilon$ otherwise. Equation 2 can be rewritten as shown in Equation 3. (Since the prior probability of the data (D) is the same for each model, the equation becomes a statement of proportionality and (D) can be ignored.)

$$p(e|D) \propto p(e)(1-\varepsilon)^r * \varepsilon^{n-r} \qquad \text{Equation (3):}$$

where r is the number of examples correctly classified by h. $\varepsilon$ can be estimated by the average error rate of the model on the data.

In this case, the outputs from individual hypotheses are combined in a variety of ways to create a set of diverse ensembles. The output from each ensemble is then weighted by the probability that the ensemble is correct given the training data. Now, instead of integrating out uncertainty about which ensemble member is correct, we are instead integrating out uncertainty about which model combination is correct.

The disclosed framework is generic and powerful enough to be used in wide variety of cases. Those use cases can broadly be divided into two types:

Categorization of products: The disclosed framework can automatically select the best category for each new product if some text description and/or images of the new product are available.

Recommendation of Similar items: If a customer is looking for a particular item, the system can use either the text description or image provided by the customer to recommend similar items.

Results Table

The following results illustrate the efficacy of using the disclosed methods to group new items.

TABLE 3

| Department | Category | No of Items | Number of items with Image | Number of Line group | Number of Line groups with at least one image | Overall Accuracy |
|---|---|---|---|---|---|---|
| LAWN AND GARDEN | GRILL ACCESSORIES | 703 | 627 | 347 | 324 | 88.60 |
| BEDDING | SHEETS1 | 1830 | 1529 | 289 | 262 | 81.01 |
| PERSONAL CARE | PERSONAL CARE | 1864 | 1388 | 161 | 136 | 89.89 |
| HOUSEHOLD CHEMICALS/SUPP | ADDITIVES | 1168 | 1032 | 261 | 251 | 85.98 |
| LADIES SOCKS | LINERS | 376 | 201 | 10 | 7 | 74.28 |
| IMPULSE MERCHANDISE | COLLECTIBLES | 2633 | 1168 | 527 | 305 | 87.17 |
| COMM BREAD | BREAD | 1397 | 1016 | 341 | 266 | 90.85 |
| PHARMACY OTC | ACTIVE NUTRITION | 782 | 660 | 115 | 107 | 94.93 |
| BOYS WEAR | CASUAL PANTS (D24) | 2180 | 1682 | 30 | 30 | 98.87 |
| SLEEP WEAR/ FOUNDATIONS | FASHION SLEEPWEAR | 4138 | 940 | 125 | 43 | 77.32 |

Figure 1:
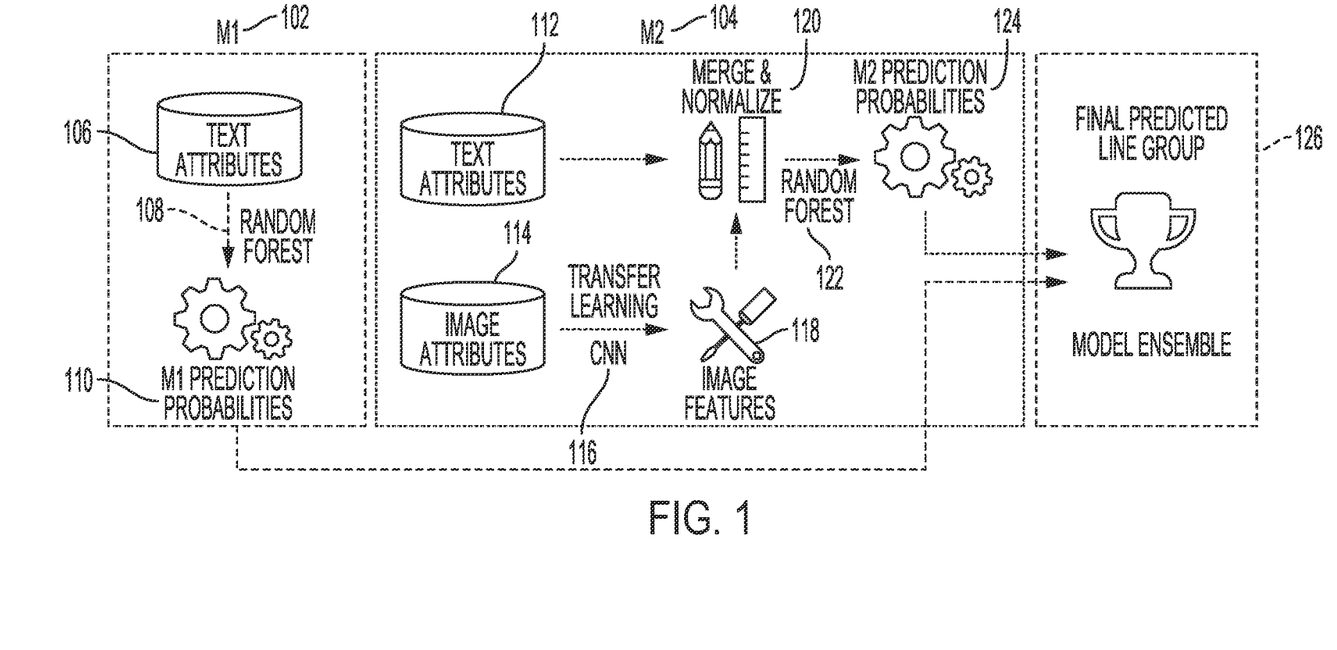
FIG. 1 an example of two distinct models being combined for a final prediction.

FIG. 1 an example of two distinct models M1 102 and M2 104 being combined for a final prediction 126. As illustrated, model M1 102 uses only text attributes 106 of a given object in attempting to classify the object. With the given text attributes 106, the model 102 attempts to classify the object using a text-based random forest classification 108, resulting in M1 prediction possibilities 110. These are the class predictions made by the M1 model 102 using only the text attributes 106.

Model M2 104 also uses text attributes 112 (which may or may not be the same text attributes 106 used by model M1 102), but also uses image attributes 114 of the object. The image attributes can be, for example, color, intensity, etc., of specific pixels in a bitmap or other digital copy of an image of the object. These image attributes 114 are provided as input to a CNN 116, which identifies image features 118 within the image. The image features 118 and the text attributes 112 are merged and normalized 120, then input to a random forest classifier 122, resulting in M2 prediction possibilities 124, the class predictions made by the M2 model 104 using both text 112 and image attributes 114.

The prediction possibilities 110, 124 are then combined as a model ensemble 126, resulting in a final classification/prediction.

Figure 2:
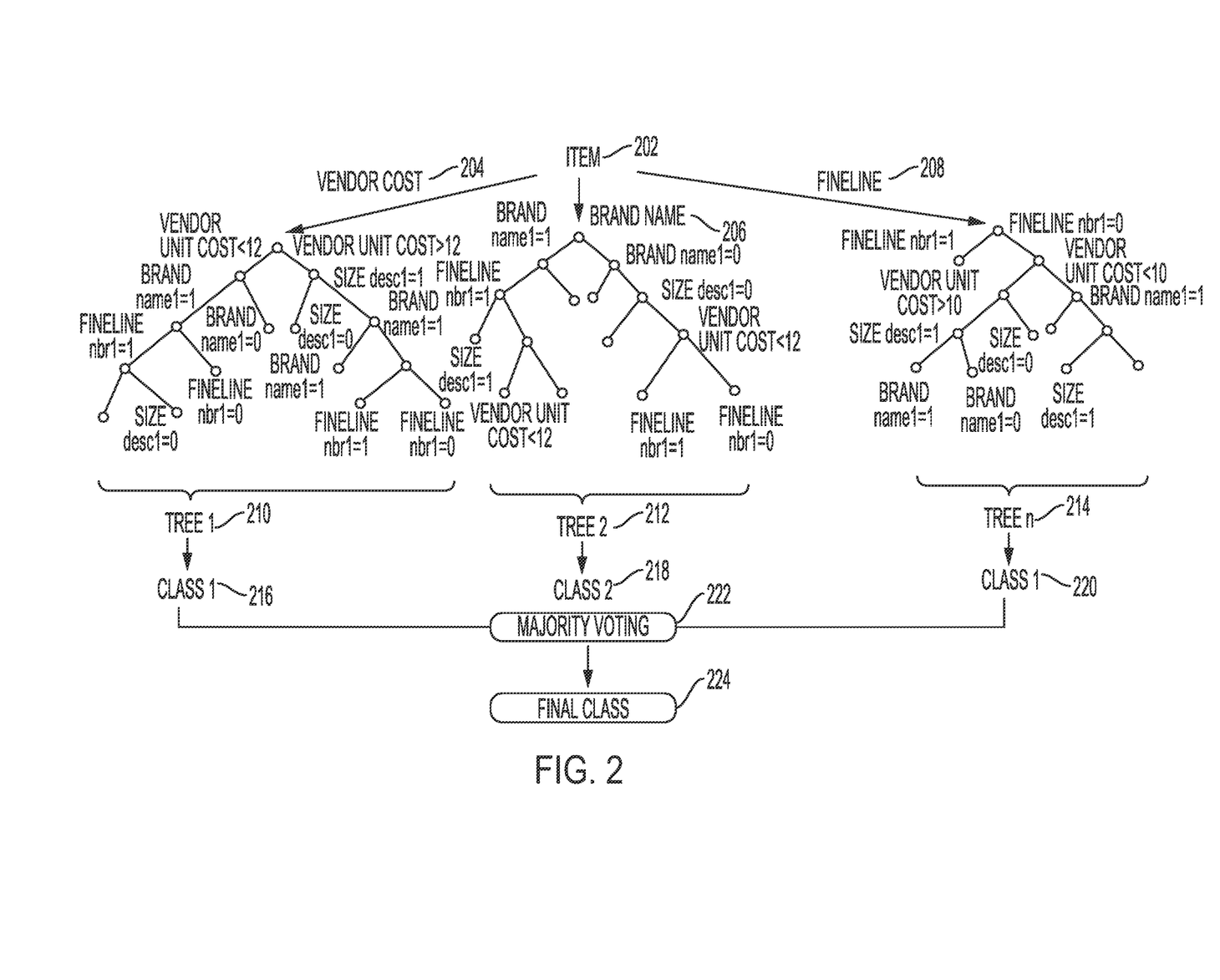
FIG. 2 illustrates an example of a random forest model.

FIG. 2 illustrates an example of a random forest model. In this example, the item 202 being classified for a store, with the item 202 having non-image attributes of a vendor cost 204, brand name 206, and a fineline number 208 (aka a hierarchy number, or hierarchy attribute). For each attribute 204, 206, 208 being evaluated by the random forest model, a classification tree 210, 212, 214 exists. In this example, the top of each respective tree 210, 212, 214 splits the respective tree based on the respective attribute 204, 206, 208. As each respective tree progresses, additional attributes are evaluated until a classification 216, 218, 220 for that specific tree, is identified. The additional attributes evaluated within each respective tree can be distinct from tree to tree, or can be the same from tree to tree. The order of additional attributes can similarly vary from tree to tree.

When the respective trees 210, 212, 214 have been evaluated and respective classes 216, 218, 220 identified, the system uses majority voting 222 among the identified classes 216, 218, 220 to determine a final class 224, which is the output of the random forest.

Figure 3:
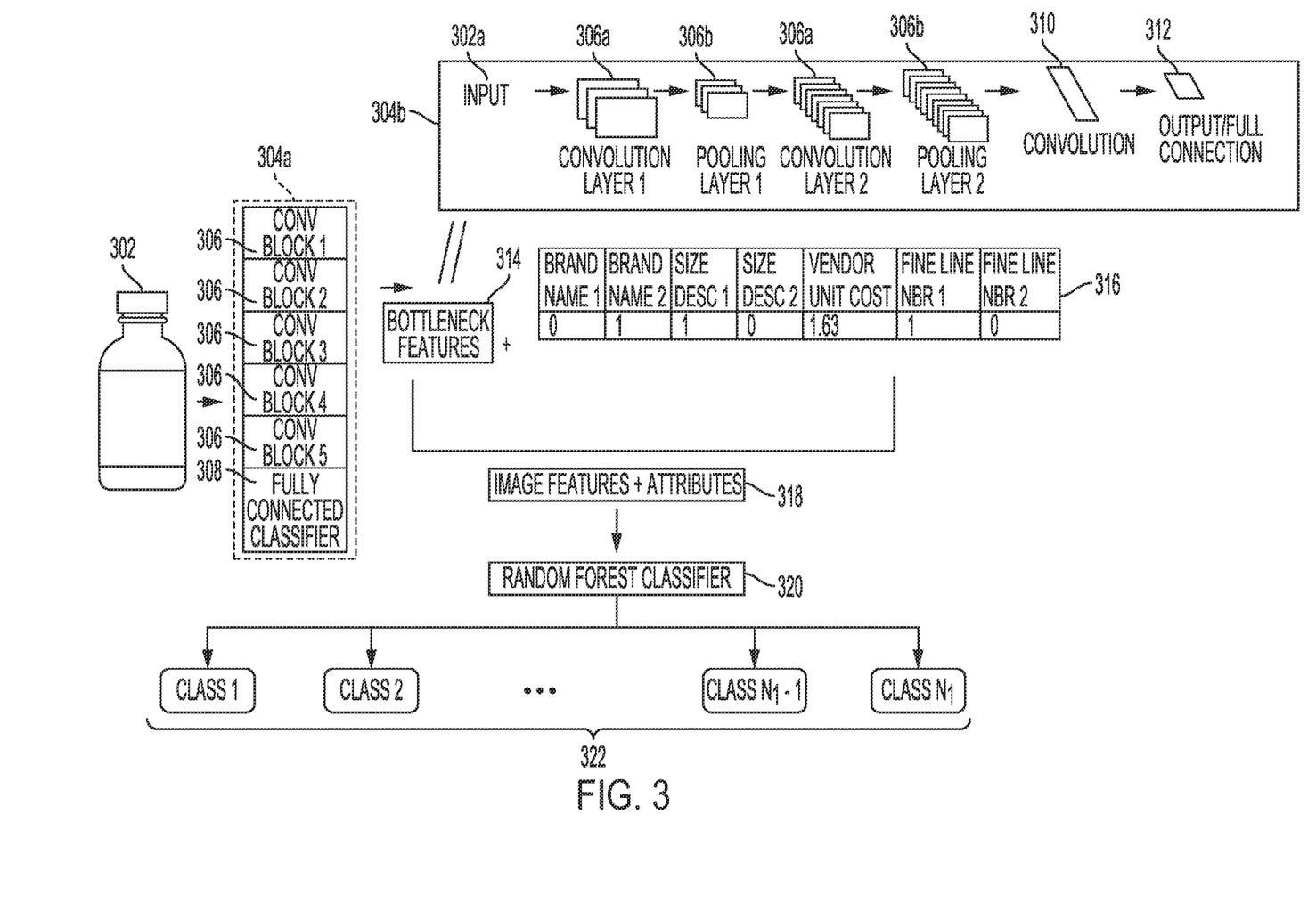
FIG. 3 illustrates an example of using a CNN to classify an image.

FIG. 3 illustrates an example of using a CNN 304a, 304b to classify an image of an item 302. In this example, a CNN 304a, 304b is represented in two separate (although equivalent) illustrations. In the first version 304a, the CNN is represented in a compact fashion 304a, such that the CNN 304a contains convolutional blocks 306, each respective block made up of convolutional and pooling layers which feed off one another until reaching a fully connected classifier 308. In the second version 304b, the image 302 becomes an input 302a, and convolutional layers 306a are shown as being followed by pooling layers 306b. A final convolution 301 results in a full connection/output layer 312. The result of the CNN (either 304a or 304b) is a list of bottleneck features 314, which are those features which the CNN has recognized. These bottleneck features 314 can be combined 318 with attributes 316 about the item, such as brand name, description, cost, hierarchy (fineline), etc. The combined image features and attributes 318 are then fed into a random forest classifier 320 configured to use inputs from both the text attributes 316 and the bottleneck (image) features 314, with the output of the random forest classifier 320 being one or more classes 322 to which the item 302 will belong.

Figure 4:
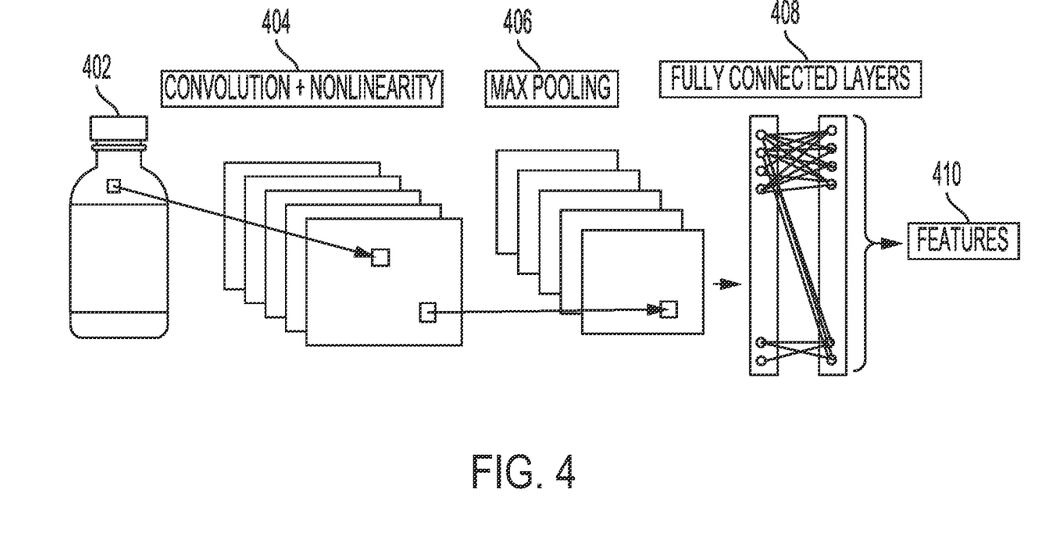
FIG. 4 illustrates additional details regarding the operation of the CNN.

FIG. 4 illustrates additional details regarding the operation of the CNN. In this example, an image of the object 402 is analyzed by the CNN, with the first step in the CNN being a convolution and nonlinearity step 404. From this convolution and non-linearity step 404, the CNN moves to a max pooling step 406, where the results from the convolution and non-linearity step 404 are combined together. These respective steps 404, 406 repeat as necessary with, the result that at the end of the CNN process, fully connected layers 408 are identified, the combination of which identifies specific features 410 from which the classification can be determined.

Figure 5:
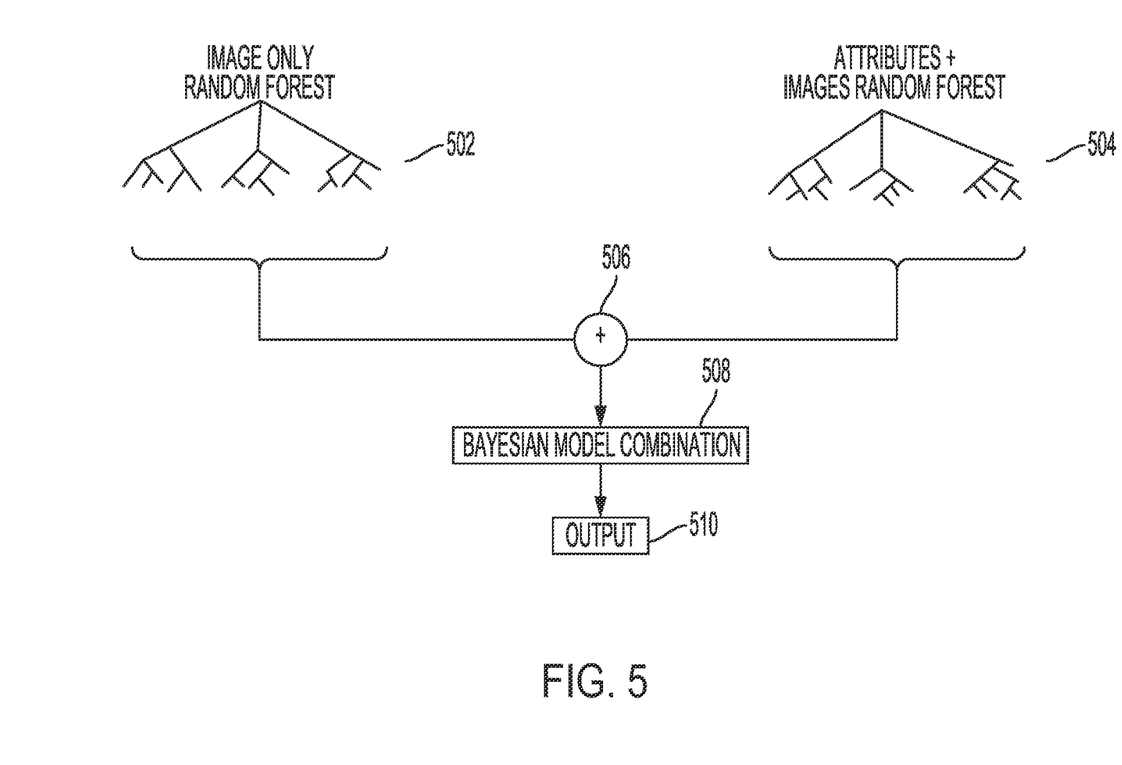
FIG. 5 illustrates an example of a Bayesian Model combination to obtain a desired output.

FIG. 5 illustrates an example of a Bayesian Model combination to obtain a desired output. In this example, the outputs of two distinct models 502, 504, one 502 relying only on image attributes and another 504 relying both on image attributes and non-image attributes. In other configurations, additional models (such as a text-attribute only model) can also be executed and their results relied upon. For both models 502, 504 illustrated, the system uses a random forest to classify the input, then combines 506 the results of that classification into a Bayesian Model Combination 508. The Bayesian Model Combination 508 is then executed, with the resulting output 510 being the classification which will be associated with the item.

Figure 6:
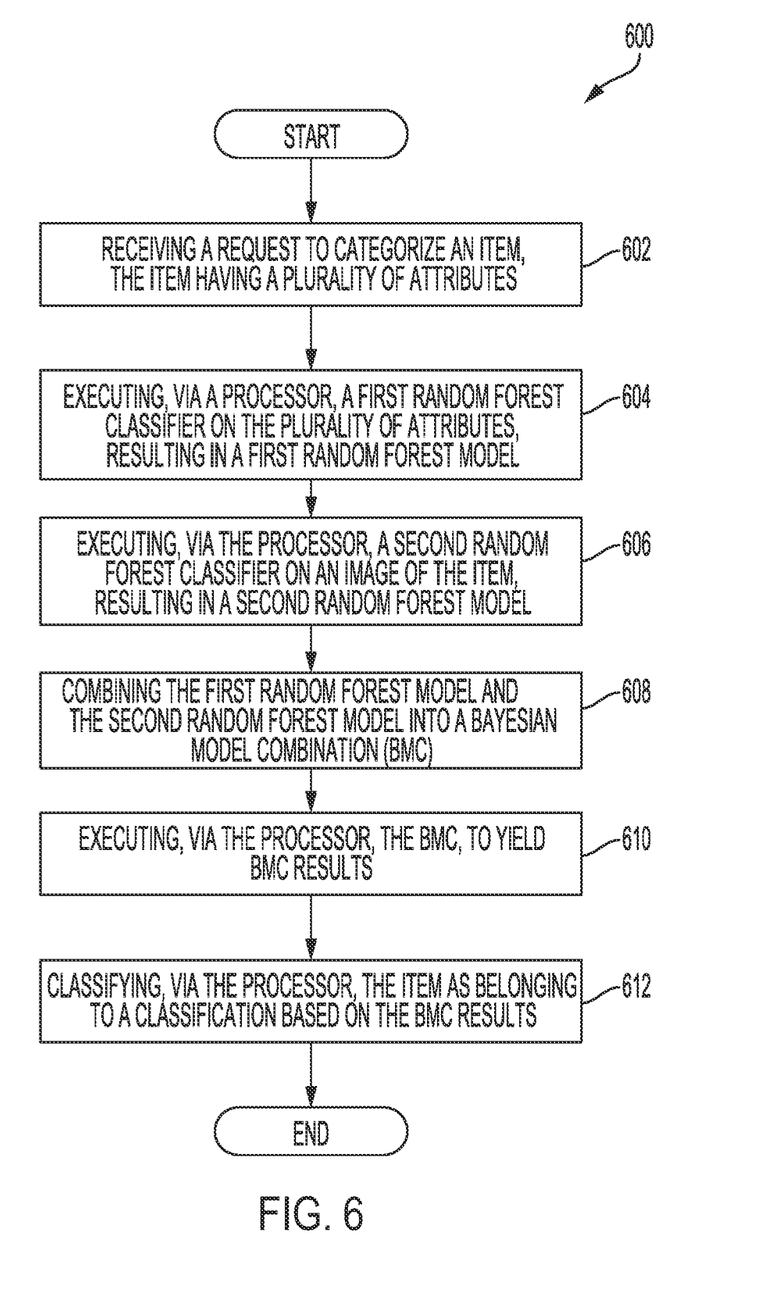
FIG. 6 illustrates an example method.

FIG. 6 illustrates an example method. A system configured as disclosed herein receives a request to categorize an item, the item having a plurality of attributes (602), and executes, via a processor, a first random forest classifier on the plurality of attributes, resulting in a first random forest model (604). The system also executes, via the processor, a second random forest classifier on an image of the item, resulting in a second random forest model (606), and combines the executed random forest model and the second random forest model into a Bayesian Model Combination (BMC) (608). The system then executes, via the processor, the BMC, to yield BMC results (610) and classifies, via the processor, the item as belonging to a classification based on the BMC results (612).

In some configurations, the execution of the BMC can include creating all possible linear combinations of the first random forest model and the second random forest model.

In some configurations, the first random forest model and the second random forest model have distinct classification results.

In some configurations, the method can further include generating, via the processor, a list of items similar to the item based on the classification.

In some configurations, the method can further include generating, via the processor, a convolutional neural network model of the item using a convolutional neural network. In such configurations, such a method can further include creating a convex linear combination of the first random forest model, the second random forest model, and the convolutional neural network model, the convex linear combination having weights for each model proportional to an accuracy of each respective model, wherein the classifying of the item as belonging to the classification further comprises using the convex linear combination.

In some configurations, the classifying of the item utilizes a weighted equation to generate a score based on the BMC results, wherein each quantifiable value in the quantifiable values has an associated weight, and wherein the classification for the item is determined based on the score.

Figure 7:
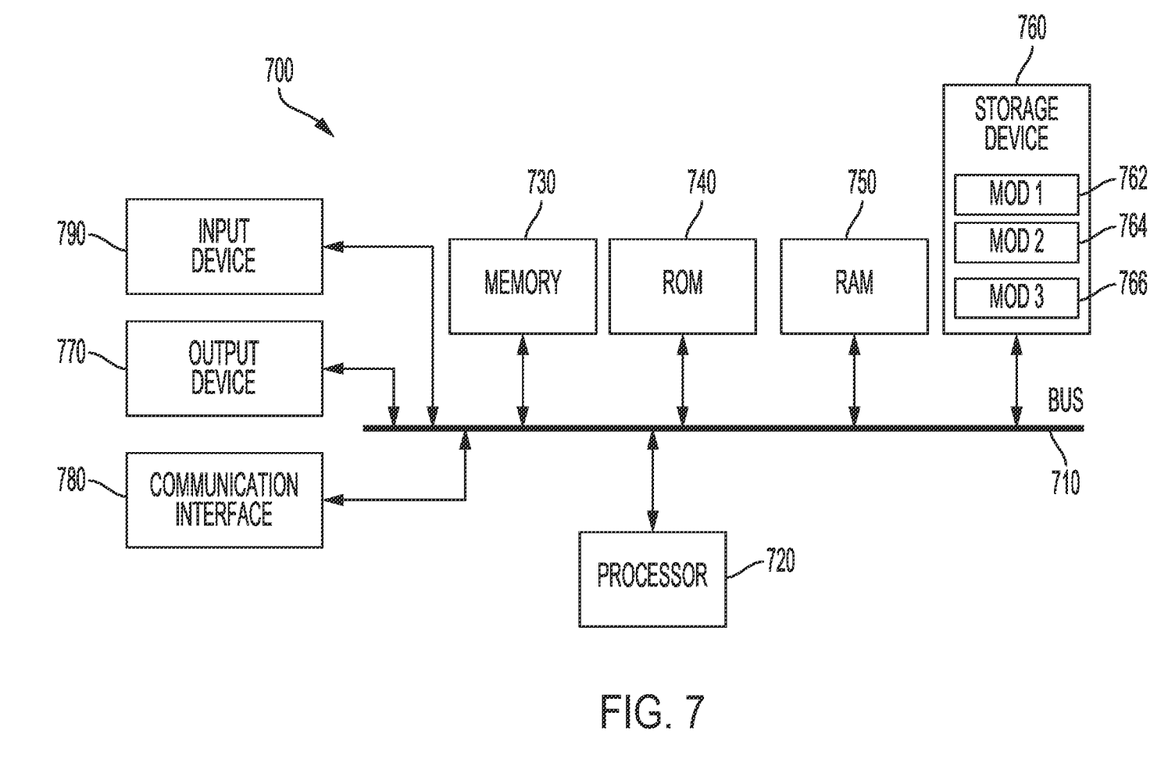
FIG. 7 illustrates an example computer system.

FIG. 7 illustrates an exemplary system includes a general-purpose computing device 700, including a processing unit (CPU or processor) 720 and a system bus 710 that couples various system components including the system memory 730 such as read-only memory (ROM) 740 and random access memory (RAM) 750 to the processor 720. The system 700 can include a cache of high-speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The steps outlined herein are exemplary and can be implemented in any combination thereof, including combinations that exclude, add, or modify certain steps.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
 receiving a request to categorize an item, the item having a plurality of attributes;
 executing, via a processor, a first random forest classifier on the plurality of attributes, resulting in a first random forest model;
 executing, via the processor, a second random forest classifier on an image of the item, resulting in a second random forest model;
 combining the executed random forest model and the second random forest model into a Bayesian Model Combination (BMC);
 executing, via the processor, the BMC, to yield BMC results; and
 classifying, via the processor, the item as belonging to a classification based on the BMC results.

2. The method of claim 1, wherein execution of the BMC comprises creating all possible linear combinations of the first random forest model and the second random forest model.

3. The method of claim 1, wherein the first random forest model and the second random forest model have distinct classification results.

4. The method of claim 1, further comprising:
 generating, via the processor, a list of items similar to the item based on the classification.

5. The method of claim 1, further comprising:
 generating, via the processor, a convolutional neural network model of the item using a convolutional neural network.

6. The method of claim 5, further comprising:
 creating a convex linear combination of the first random forest model, the second random forest model, and the convolutional neural network model, the convex linear combination having weights for each model proportional to an accuracy of each respective model,
 wherein the classifying of the item as belonging to the classification further comprises using the convex linear combination.

7. The method of claim 1, wherein the classifying of the item utilizes a weighted equation to generate a score based on the BMC results, wherein each quantifiable value in the quantifiable values has an associated weight, and wherein the classification for the item is determined based on the score.

8. A system comprising:
 a processor; and
 a computer-readable storage medium having instructions stored which, when executed by the processor, cause the processor to perform operations comprising:
  receiving a request to categorize an item, the item having a plurality of attributes;
  executing a first random forest classifier on the plurality of attributes, resulting in
  a first random forest model;
  executing a second random forest classifier on an image of the item, resulting in a second random forest model;
  combining the executed random forest model and the second random forest model into a Bayesian Model Combination (BMC);
  executing the BMC, to yield BMC results; and
  classifying the item as belonging to a classification based on the BMC results.

9. The system of claim 8, wherein execution of the BMC comprises creating all possible linear combinations of the first random forest model and the second random forest model.

10. The system of claim 8, wherein the first random forest model and the second random forest model have distinct classification results.

11. The system of claim 8, the computer-readable storage medium having additional instructions which, when executed by the processor, cause the processor to perform operations comprising:
 generating a list of items similar to the item based on the classification.

12. The system of claim 8, the computer-readable storage medium having additional instructions which, when executed by the processor, cause the processor to perform operations comprising:
 generating a convolutional neural network model of the item using a convolutional neural network.

13. The system of claim 12, the computer-readable storage medium having additional instructions which, when executed by the processor, cause the processor to perform operations comprising:
 creating a convex linear combination of the first random forest model, the second random forest model, and the convolutional neural network model, the convex linear combination having weights for each model proportional to an accuracy of each respective model,
 wherein the classifying of the item as belonging to the classification further comprises using the convex linear combination.

14. The system of claim 8, wherein the classifying of the item utilizes a weighted equation to generate a score based on the BMC results, wherein each quantifiable value in the quantifiable values has an associated weight, and wherein the classification for the item is determined based on the score.

15. A non-transitory computer-readable storage medium having instructions stored which, when executed by a computing device, cause the computing device to perform operations comprising:
- receiving a request to categorize an item, the item having a plurality of attributes;
- executing a first random forest classifier on the plurality of attributes, resulting in a first random forest model;
- executing a second random forest classifier on an image of the item, resulting in a second random forest model;
- combining the executed random forest model and the second random forest model into a Bayesian Model Combination (BMC);
- executing the BMC, to yield BMC results; and
- classifying the item as belonging to a classification based on the BMC results.

16. The non-transitory computer-readable storage medium of claim 15, wherein execution of the BMC comprises creating all possible linear combinations of the first random forest model and the second random forest model.

17. The non-transitory computer-readable storage medium of claim 15, wherein the first random forest model and the second random forest model have distinct classification results.

18. The non-transitory computer-readable storage medium of claim 15, having additional instructions which, when executed by the computing device, cause the computing device to perform operations comprising:
- generating a list of items similar to the item based on the classification.

19. The non-transitory computer-readable storage medium of claim 15, having additional instructions which, when executed by the computing device, cause the computing device to perform operations comprising:
- generating a convolutional neural network model of the item using a convolutional neural network.

20. The non-transitory computer-readable storage medium of claim 19, having additional instructions which, when executed by the computing device, cause the computing device to perform operations comprising:
- creating a convex linear combination of the first random forest model, the second random forest model, and the convolutional neural network model, the convex linear combination having weights for each model proportional to an accuracy of each respective model,
- wherein the classifying of the item as belonging to the classification further comprises using the convex linear combination.

* * * * *